(12) United States Patent
Kapoor et al.

(10) Patent No.: US 9,604,357 B2
(45) Date of Patent: Mar. 28, 2017

(54) ROBOT AND DEVICE HAVING MULTI-AXIS MOTION SENSOR, AND METHOD OF USE THEREOF

(71) Applicant: KABUSHIKI KAISHA YASKAWA DENKI, Kitakyushu-shi (JP)

(72) Inventors: Chetan Kapoor, Austin, TX (US); Changbeom Park, Austin, TX (US); Ratheesh Rajan, Austin, TX (US); Andrew Boddiford, Austin, TX (US)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 54 days.

(21) Appl. No.: 14/813,045

(22) Filed: Jul. 29, 2015

(65) Prior Publication Data

US 2016/0031078 A1 Feb. 4, 2016

Related U.S. Application Data

(60) Provisional application No. 62/030,651, filed on Jul. 30, 2014.

(51) Int. Cl.
| | |
|---|---|
| *G05B 15/00* | (2006.01) |
| *G05B 19/00* | (2006.01) |
| *B25J 9/00* | (2006.01) |
| *B25J 13/00* | (2006.01) |
| *G05B 19/427* | (2006.01) |

(52) U.S. Cl.
CPC ........... *B25J 9/0081* (2013.01); *B25J 13/003* (2013.01); *G05B 19/427* (2013.01); *Y10S 901/05* (2013.01)

(58) Field of Classification Search
CPC ........ B25J 9/0081; B25J 13/00; B25J 13/003; G05B 19/427; Y10S 901/05; Y10S 901/00; Y10S 901/01; Y10S 901/03
USPC ................................................. 700/245, 258
See application file for complete search history.

(56) References Cited

U.S. PATENT DOCUMENTS

| | | | |
|---|---|---|---|
| 8,886,359 B2 * | 11/2014 | Inaba ...................... | B25J 9/163 700/245 |
| 2003/0160520 A1* | 8/2003 | Gloden .................. | B25J 19/063 307/326 |
| 2005/0166413 A1* | 8/2005 | Crampton .............. | B25J 13/088 33/503 |
| 2014/0031983 A1* | 1/2014 | Low ....................... | B25J 9/0087 700/257 |

\* cited by examiner

*Primary Examiner* — Jaime Figueroa
(74) *Attorney, Agent, or Firm* — Mori & Ward, LLP (57) ABSTRACT

A device including a housing configured to attach to a robot arm, and a multi-axis motion sensor provided within the housing. The multi-axis motion sensor is configured to detect movement of the housing, and is configured to communicate with a controller of the robot arm. The device further includes a user interface configured to operate in conjunction with the multi-axis motion sensor, and a connection port provided on the housing. The connection port is configured to connect to an external device.

20 Claims, 9 Drawing Sheets

ROBOT AND DEVICE HAVING MULTI-AXIS MOTION SENSOR, AND METHOD OF USE THEREOF

CROSS-REFERENCE TO RELATED APPLICATION

The present application claims priority to U.S. Provisional Application No. 62/030,651, filed on Jul. 30, 2014, the entire contents of which are herein incorporated by reference.

BACKGROUND OF THE INVENTION

Field of the Invention

The present invention relates to operation and teaching of a robot.

Discussion of the Background

There are three basic methods for programming industrial robots: pendant based teaching, offline teaching, and lead-through teaching.

Pendant based teaching method involves moving of a physical robot through an operator interface (or teaching pendant) that allows the operator to command motion of each axes of the robot. Various choices are available for axes of motion based on a coordinate frame selected by the operator. For example, axis (joint) coordinates allow the motion of each joint axes of the robot in its respective positive and negative direction, robot coordinates use a robot that is installed with a coordinate frame at an origin of the robot aligned with a given world frame, and tool coordinates represent a coordinate frame that is attached to a robot tool plate that is a mechanical part of the robot on which an end-effector (such as a gripper) is installed. However, each of these coordinate frames may not be intuitive or obvious to a user who is teaching the robot.

Offline teaching is another technique which uses a virtual robot (comprised of a 3D model of the robot and potentially other items in a robot workcell) instead of a physical robot. Some of these virtual environments have integrated computer-aided design capabilities and allow the user to point and click on a position of interest, thereby causing the simulated robot to move to that point. This feature reduces the manual effort required to jog (drive) the robot to the intended position in three dimensional space.

Lead-through teaching is another method of robot programming that involves teaching the robot application logic and specific positions by moving the robot by grasping its end-effector and moving it through the task it is supposed to accomplish. This technique can be used to teach the path the robot has to follow along with specific positions and some application logic. To get the direction input from the user, force/torque sensors are usually used. An advantage of this approach is that an operator can not only teach the path, the positions, but can also teach resistive force that the robot needs to apply to the environment when contact is made. The challenge is that the force/torque sensors used in this approach are relatively expensive, which makes the robot system with lead through teaching less attractive in terms of cost.

While lead-through teaching can be intuitive to a user, current lead-through teaching device and methods are relatively expensive and limited in their ability to be incorporated into a robot system. Accordingly, a method and device is needed that can overcome the disadvantages and limitations of other such devices.

During operation, a robot may collide with an obstacle. To prevent damage to the robot, the end-effector, and the obstacle, the collision needs to be detected to have the robot stopped. Various devices and methods are available for collision detection, such as a dedicated collision detection device, a joint torque-based collision detection device that detects collision by measuring torque exerted on each joint, and a motor torque based collision detection. However, these methods have various disadvantages, such as limited accuracy and additional expense related to the various sensors used. Accordingly, a method and device is needed that can overcome the disadvantages and limitations of other such devices.

Additionally, when vibration occurs during a robot's operation, the speed and/or the acceleration of the motion needs to reduced, in turn, causing higher cycle time. Since the vibration of a robot cannot be fully estimated in advance, a robot controller may assume a worst case scenario and reduce overall cycle time performance to avoid potential vibration. Accordingly, there is a need for a cost effective manner to allow a robot to achieve better cycle time performance.

SUMMARY OF THE INVENTION

Embodiments of the present invention advantageously provide a device that includes a housing configured to attach to a robot arm, and a multi-axis motion sensor provided within the housing, where the multi-axis motion sensor is configured to detect movement of the housing and is configured to communicate with a controller of the robot arm. The device further includes a user interface configured to operate in conjunction with the multi-axis motion sensor, and a connection port provided on the housing, where the connection port is configured to connect to an external device.

Embodiments of the present invention advantageously provide a robot including a robot arm, a controller configured to control the robot arm, and a device having a housing attached to the robot arm and a multi-axis motion sensor provided within the housing. The multi-axis motion sensor is configured to detect movement of the housing and is configured to communicate with the controller of the robot arm. The device further includes a user interface configured to operate in conjunction with the multi-axis motion sensor, and a connection port provided on the housing, where the connection port is configured to connect to an external device.

Embodiments of the present invention advantageously provide a method including attaching a device to a robot arm, where the device includes a housing for attaching to the robot arm, and a multi-axis motion sensor provided within the housing, where the multi-axis motion sensor is configured to detect movement of the housing and is configured to communicate with a controller of the robot arm. The device further includes a user interface configured to operate in conjunction with the multi-axis motion sensor, and a connection port provided on the housing, where the connection port is configured to connect to an external device. The method further includes detecting movement of the housing using the multi-axis motion sensor, and controlling operation of the robot arm using the detected movement of the housing.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF EXEMPLARY EMBODIMENTS OF THE INVENTION

Embodiments of the present invention will be described hereinafter with reference to the accompanying drawings. In the following description, the constituent elements having substantially the same function and arrangement are denoted by the same reference numerals, and repetitive descriptions will be made only when necessary.

The phrase "multi-axis motion sensor" used herein generally refers to any type of device that detects motion (i.e. motion sensing device) that provides three degrees of freedom or more. For example, the non-limiting embodiments described herein include a 3D mouse as the multi-axis motion sensor. The 3D mouse can provide displacement motion sensing along three axes and rotational motion sensing about the three axes, thereby providing a six-dimensional motion sensing device. The 3D mouse can operate use a variety of sensors, for example, the 3D mouse can be a mechanical assembly with strain gauges, accelerometers, etc. provided therein, or the 3D mouse can function using ultrasound.

Described herein are embodiments of a device including a housing configured to attach to a robot arm, and a 3D mouse, as an embodiment of a multi-axis motion sensor, provided within the housing. The 3D mouse is configured to detect movement of the housing, and is configured to communicate with a controller (see, e.g., controller 701 in FIG. 7) of the robot arm. The device further includes a user interface configured to operate in conjunction with the 3D mouse, and a connection port provided on the housing, where the connection port is configured to connect to an external device.

Embodiments of the device provide an integrated device with a multi-axis motion sensor that can simplify robot programming, detect error during motion, improve performance of a robot's motion, and can function as a hub for other peripheral devices. For example, embodiments of the device can be used to perform tasks, such as providing built-in capability for lead-through programming (jogging and teaching), providing built-in sensing for collision detection during robot motion, providing built-in sensing for vibration, which can be used for better motion performance, providing built-in capability for operator communication, providing a hub for sensor integration, providing a hub for tool mechanical and control integration, etc.

Figure 1:
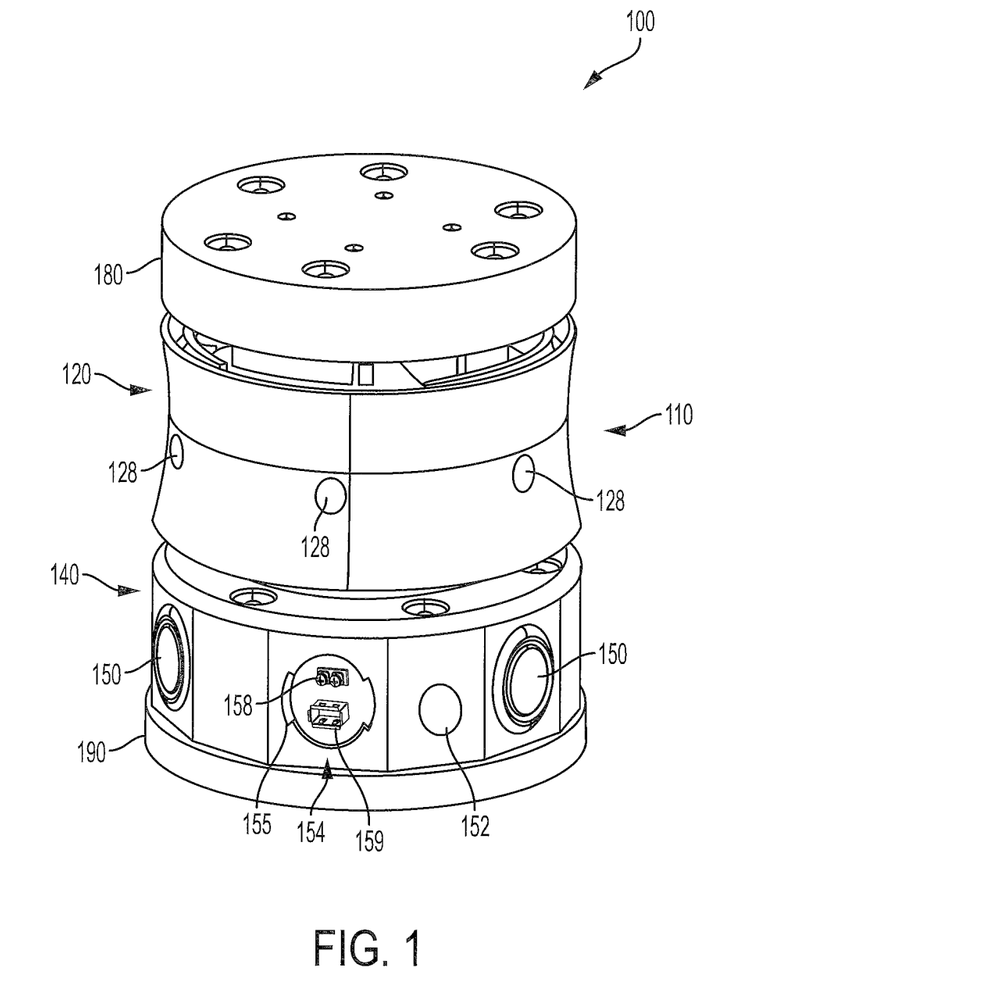
FIG. 1 is an assembled, perspective view of a device according to an embodiment of the invention.
Figure 2:
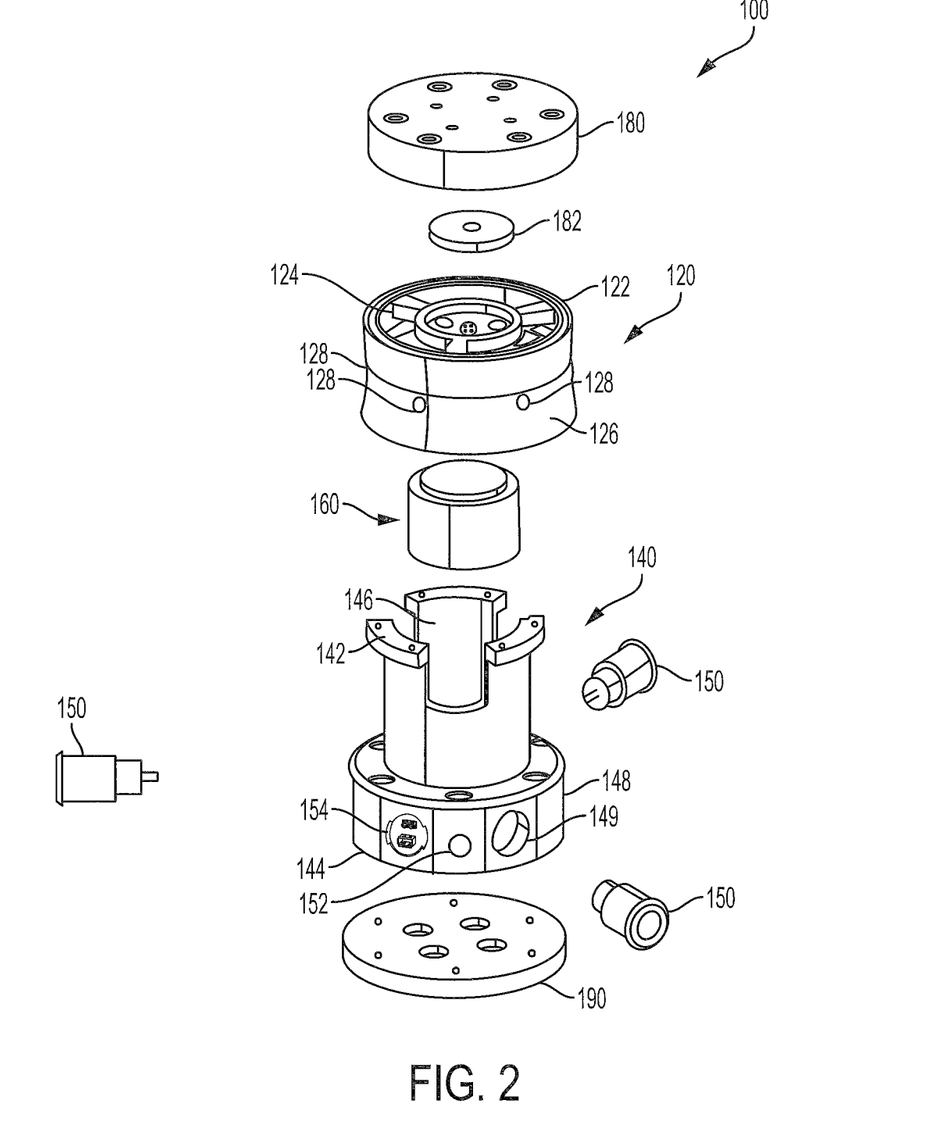
FIG. 2 is an exploded, perspective view of the device depicted in FIG. 1.

FIG. 1 shows an assembled, perspective view of a device 100 according to an embodiment of the invention. FIG. 2 show an exploded, perspective view of the device 100 depicted in FIG. 1. The device 100 shown in FIGS. 1 and 2 includes a housing 110 having a cap 120 and a base housing 140. A 3D mouse 160 is provided within the housing 110. A top plate 180 is provided that is attached to an upper surface of the cap 120, and a base plate 190 is provided that is attached to a lower surface of the base housing 140.

The housing 110 is configured to attach to a robot arm, for example, via the top plate 180 and/or via the base plate 190. As will be described in greater detail below, the device can be mounted to a robot arm in various configurations, for example, in an in-line (or series) configuration (see, e.g. FIG. 3) with an end-effector, in a parallel configuration with an end effector (see, e.g., FIG. 4), in in-line or parallel configurations at other locations on the robot arm. Mounting holes are provided on the top plate 180 and the base plate 190 to attach these plates together, to the housing 110, and/or to other components, such as to the mechanical interface of a robot arm, an end-effector, etc. Additionally, holes can be provided through the top plate 180 and/or the base plate in order to allow cables to extend therethrough for power supply, communication, etc.

Figure 3:
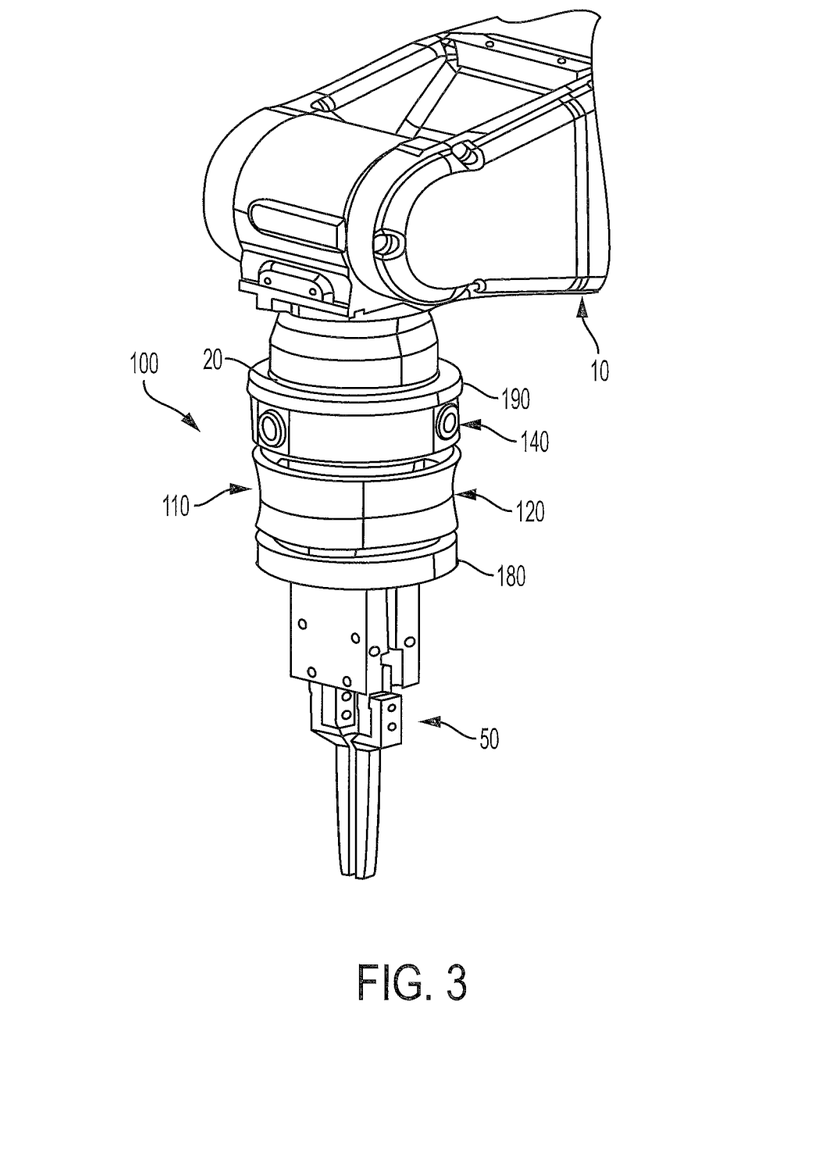
FIG. 3 is a perspective view of the device depicted in FIG. 1 mounted to a robot arm in an in-line (or series) configuration with an end-effector.
Figure 4:
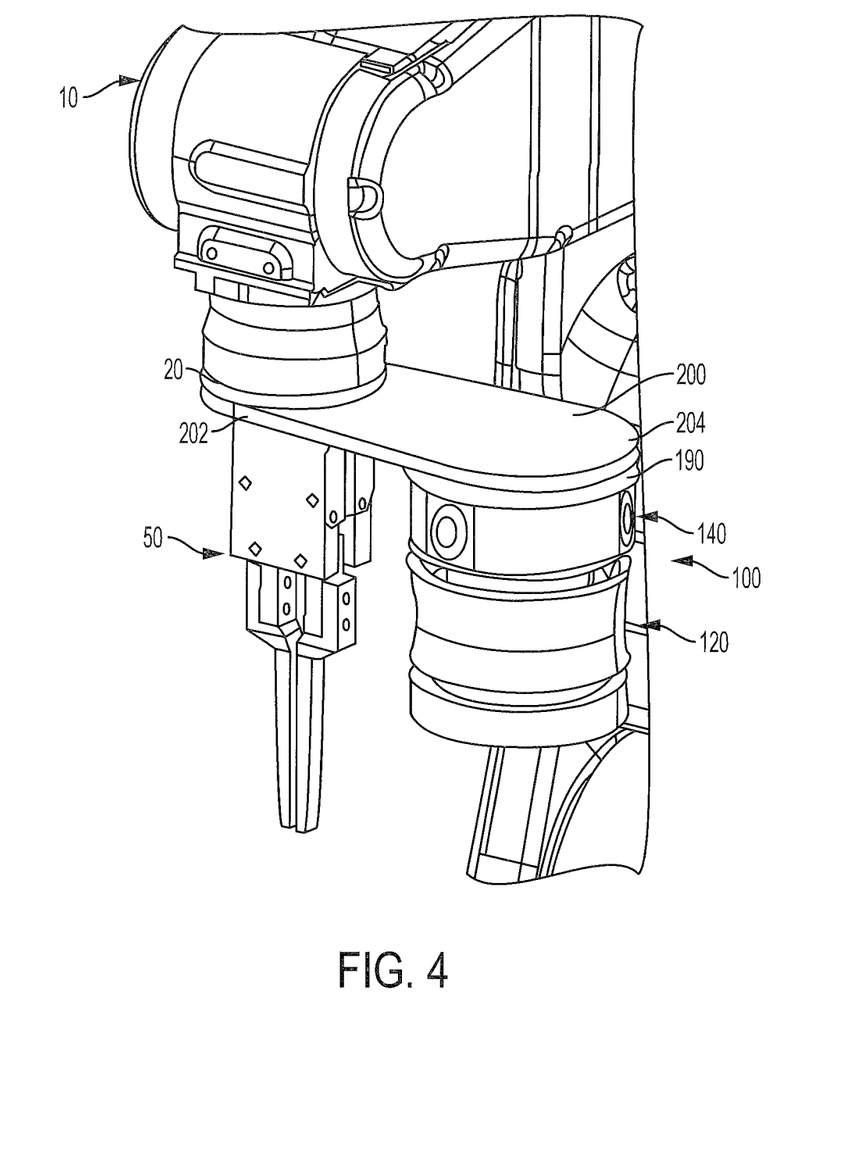
FIG. 4 is a perspective view of the device depicted in FIG. 1 mounted to a robot arm in a parallel configuration with an end-effector.

In the embodiments shown in FIGS. 3 and 4, the base plate 190 is attached to the mechanical interface of the robot, and therefore the base plate 190 is acting as a mounting plate. The top plate 180 can be attached to the end-effector if in-line configuration is used. In a parallel configuration, the top plate 180 can be left unattached. The top plate 180 is also attached to a top portion 142 of the base housing 140, and the base housing 140 has a bottom portion 144 that is attached to the base plate 190. The top portion 142 of the base housing 140 extends up to corresponding openings 124 in an upper portion 122 of the cap 120, when the cap 120 is provided on the base housing 140. The top plate 180, the base housing 140, and the base plate 190 will carry all the loads from the end-effector when the device 100 is provided in the in-line configuration.

The base housing 140 has a recess 146 receiving the 3D mouse 160. When the cap 120 is connected to the base housing 140, the cap 120 covers the recess 146, thereby enclosing the 3D mouse 160 within the housing 110. The 3D mouse 160 is attached to the base housing 140, and a top of 3D mouse 160 is attached to the cap 120 using an adapter plate 182. A user will hold the cap 120, and push or pull the cap 120 in the direction the user wants to move the robot's end-effector. The 3D mouse 160 is configured to detect movement of the housing 110. The 3D mouse 160 is configured to detect acceleration, for example, in order to determine vibration of the device or collision with an object, and the 3D mouse 160 is configured to transmit the detected acceleration to the controller. The 3D mouse 160 is configured to communicate with a controller of the robot arm either using a wired connection or wireless communication.

The device further includes a user interface configured to operate in conjunction with the 3D mouse. The user interface of the device can include one or more of: one or more lights 128 for conveying information to a user; one or more buttons 150 for allowing for user input; and one or more microphones and/or speakers 152 for input or outputting information. As can be seen in FIGS. 1 and 2, the user interface can include one or more first user interface devices provided on an outer circumferential surface 148 of the base housing 140, such as the buttons 150 and microphone 152, and the user interface can include on one or more second user interface devices provided on an outer circumferential surface 126 of the cap 120, such as lights 128.

The buttons 150 can communicate with the controller of the robot arm and can include one or more of: a motion selection button configured to select a type of motion of the robot arm; an end effector button configured to control operation of an end effector mounted to the robot arm; and a teaching button control to teach an operation of the robot arm to the controller. The buttons 150 are removably mounted within holes 149 on the outer circumferential surface 148 of the base housing 140. By pressing the buttons 150, the user can command operations such as mode change, teaching operations, and end-effector action.

The lights 128 can be of various types (e.g., light emitting diodes (LEDs), conventional bulbs, etc.) and can be of various colors or color changing lights. The lights 128 can be configured to provide indicia of a status of operation of the robot arm, and/or convey any variety of information to the user. The lights 128 are used to inform the user of the current status of the robot. By using various colors, the lights 128 can be used to show the robot's current mode. For example, the current mode can be a teach mode or a play mode, which can be indicated by using a specific one of the lights 128 or by using a specific color. By blinking the lights 128, the device 100 can show the existence of an error.

The lights 128 can provide the operator with an indication of a current status of the robot. The lights 128 can show different colors, where each color can be assigned to a different status. One example of a color code set includes: red indicating a play mode; blue indicating a lead-through teaching mode plus a translational motion; and green indicating a lead-through teaching mode plus a rotational motion. By continuously blinking the lights 128, the device 100 can also inform the operator of the existence of an error. When the error is resolved, the blinking will stop. When one of the buttons 150 is pressed, the device 100 can acknowledge the button pressing by blinking the lights 128 for a short period of time.

The microphone 152 allows the user to record his/her voice for current events, such as the description of the current teaching point. Additionally or alternatively, the user interface can include speaker(s) for replaying recordings, providing sounds signals, such as instructions or warnings, etc.

Figure 6:
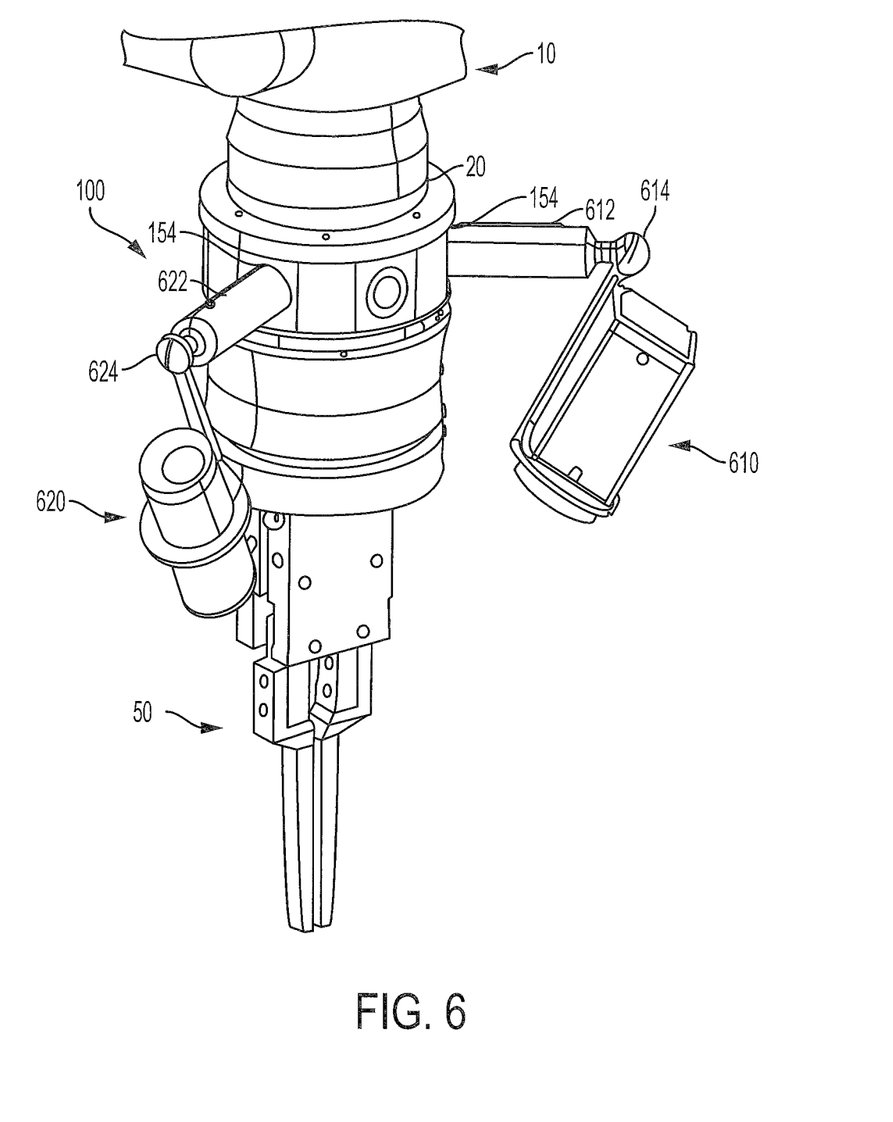
FIG. 6 is a perspective view of the device depicted in FIG. 1 mounted to a robot arm in an in-line (or series) configuration with an end-effector, where the device has external devices attached thereto.

The device 100 further includes one or more connection ports, such as connection port 154 provided on the housing 110, where the connection port 154 is configured to connect to an external device (see, e.g., FIG. 6). The external device can be one or more of a camera, a light, a sensor (e.g., an accelerometer, etc.), etc. The connection port 154 is provided on the outer circumferential surface 148 of the base housing 140. The user interface can be configured to control the external device via the connection port 154, and the connection port 154 can be configured to provide power to the external device.

Figure 5:
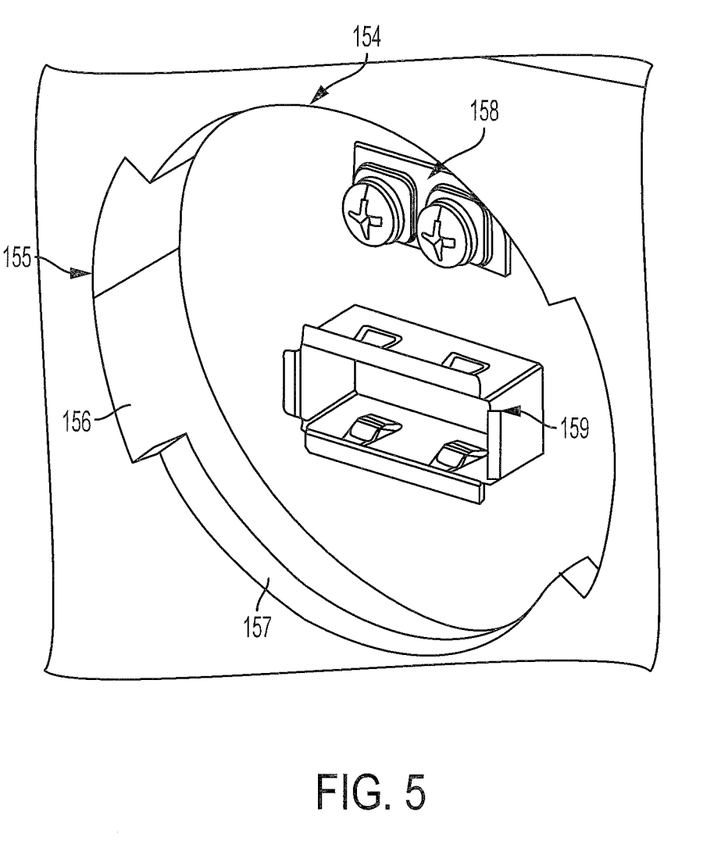
FIG. 5 is an enlarged, perspective view of a connection port of the device depicted in FIG. 1 that is configured to connect to an external device.

As can be seen in FIGS. 1 and 5, the connection port 154 includes: a mechanical interface 155 configured to mount the external device to the housing 110; a power port 158 (e.g., positive and negative DC power terminals) configured to provide power to the external device; and a communication port 159 (e.g., a universal serial bus (USB) port or other power/communication port) configured to allow communication between the external device and at least one of the user interface and the controller. The mechanical interface 155 includes an open portion 156 for receiving a mating portion on the external device, and a lip portion 157 that would engage the mating portion on the external device when the mating portion is inserted through the open portion 156 and then rotated to abut the lip portion 157. Therefore, as noted above, the user interface can be configured to control the external device via the connection port 154. For example, one or more of the buttons 150 can control power to the external device, and/or operation of the external device via the power port 158 and/or the communication port 159.

Embodiments of the device 100 can be used in conjunction with robot arms. For example, in order for a robot to perform a task, an end-effector can be attached to a link (also called mechanical interface) of a robot arm of the robot. Various types of end-effectors are used, such as grippers, welding torches, material removal tools, etc. Grippers are a common type of end-effector that are used, for example, for moving objects from one place to another. To pick up and hold products, grippers use several different power sources including vacuum (or suction), pneumatic actuator, hydraulic, and servo electric. Welding torches are used for robotic arc welding process. Robotic material removal tools include cutting, drilling and deburring tools.

Embodiments of the device 100 can be attached to a robot arm in various configurations, for example, in an in-line (or series) configuration with an end-effector, in a parallel configuration with an end effector, or in in-line or parallel configurations at other locations on the robot arm. For example, FIG. 3 depicts the device 100 in an in-line (or series) configuration on a robot arm 10 with an end-effector 50, and FIG. 4 depicts the device 100 in a parallel configuration on the robot arm 10 with the end effector 50.

In in-line configuration shown in FIG. 3, the device 100 is placed between the robot's mechanical interface 20 and the end-effector 50. More specifically, the base plate 190 of the device 100 is attached to the mechanical interface 20 and the top plate 180 of the device 100 is attached to the end-effector 50. In this embodiment, the base plate 190 is acting as the mounting plate. In the in-line configuration, the top plate 180, the base housing 140, and the base plate 190 will carry all the loads from the end-effector 50. Thus, the in-line configuration can be used when the payload is lower than the device 100 can take.

In the parallel configuration shown in FIG. 4, the device 100 and the end-effector 50 are attached to the robot's mechanical interface 20 in parallel to one another. More specifically, an adapter plate 200 is attached to the mechanical interface 20, the end effector is attached to a first portion 202 of the adapter plate 200 directly beneath the mechanical interface 20, and the base plate 190 of the device 100 is attached to a second portion 204 of the mechanical interface 20 that is offset from the mechanical interface 20. In this embodiment, the base plate 190 is acting as the mounting plate. Therefore, one portion (i.e., in this embodiment base plate 190) of the device 100 is attached to the mechanical interface 20 via the adapter plate 200, and an opposite portion (i.e., in this embodiment top plate 180) of the device 100 is not attached to anything. Thus, the parallel configuration can be used especially when the payload is higher than the device 100 can take.

FIG. 6 depicts the device 100 mounted in an in-line configuration with one end attached to a mechanical interface 20 of a robot arm 10 and the other end attached to an end effector 50. In FIG. 6, external devices are connected to connection ports 154 of the device 100. In FIG. 6, the external devices include a camera 610 and a light 620. The camera 610 is mechanically and electrically connected to a connection port 154 via a mounting arm 612 having a joint 614 to allow for movement and adjustment of the position/orientation of the camera 610. Similarly, the light 620 is mechanically and electrically connected to a connection port 154 via a mounting arm 622 having a joint 624 to allow for movement and adjustment of the position/orientation of the light 620. The device 100 can be configured to have additional connection ports that allow for mounting and operation of a variety of external devices. As noted previously, the user interface can be configured to control the external device via the connection port 154, and the connection port 154 can be configured to provide power to the external device.

Figure 7:
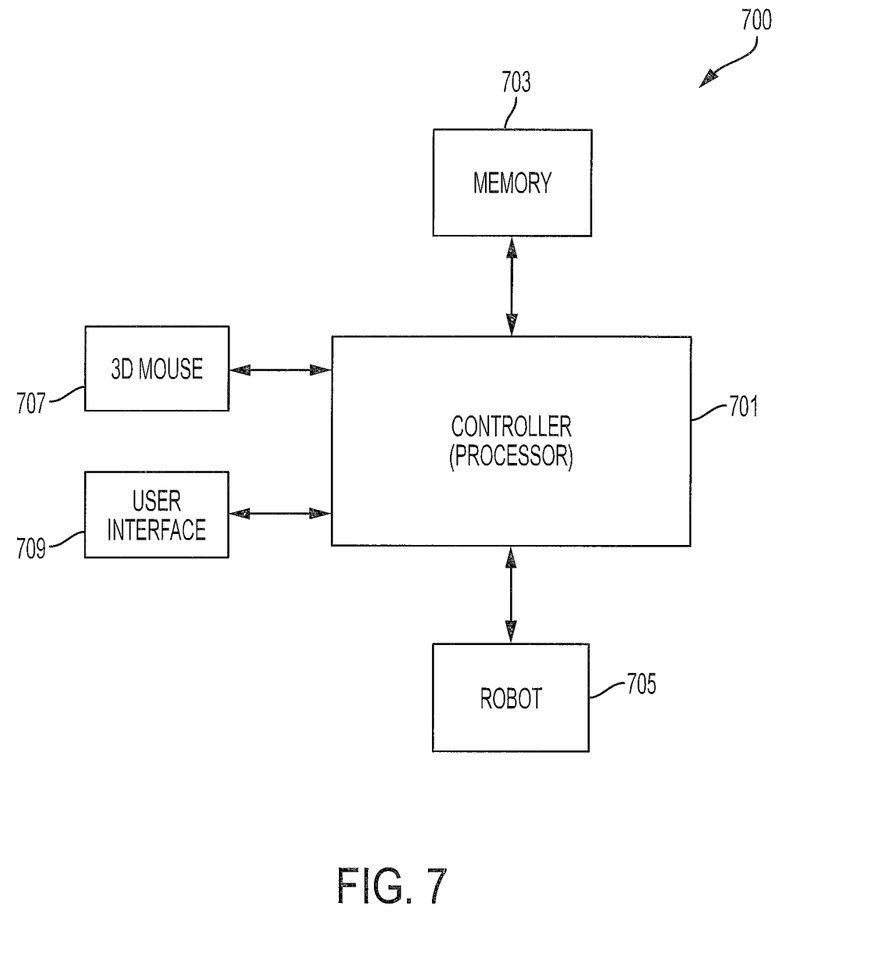
FIG. 7 is a diagram depicting an embodiment of a system of the present invention for implementing control of a robot using an embodiment of a device of the present invention.

FIG. 7 is a diagram depicting an embodiment of a system 700 for implementing control of a robot using the device of the present invention. As illustrated in FIG. 7, the system 700 includes a controller 701 that is preferably provided external to the device 100, but that can alternatively incorporated into the device 100. Controller 100 includes an information processing device such as a processor or computer that includes a central processing unit (CPU) and performs processing or control by software programming. The controller 700 can includes a CPU, a random access memory (RAM) and a read only memory (ROM). The controller 701 is connected memory 703 to store and retrieve data. The controller 701 is in wireless or wired communication with robot 705 to allow the controller to receive information form the robot 705 and to control operation of the robot 705. The controller is in wireless or wired communication with the 3D mouse 707 (e.g., 3D mouse 160) and the user interface 709 (e.g., lights 128, buttons 150, microphones and/or speakers 152, etc.) to send and receive signals. The controller 701 is programmed to implement the operational aspects of the device and robot described herein.

As can be seen from the above description, the device 100 provides not only a variety of built-in functions (such as lead-through teaching, collision detection, and vibration sensing) but also acts as a hub for sensor and tool integration. The device 100 uses a flexible 3D mouse module not only as a pointing device, but also as an acceleration sensing device, which can be used for collision detection and vibration sensing.

The device 100 can act as a lead-through programming or teaching device and thus be used for lead-through teaching by using the 3D mouse and buttons. The user can push the cap of the 3D mouse to the direction where he/she wants to move the end-effector of the robot. Then, the 3D mouse will send the direction signal to the robot controller, which, in turn, moves the robot to the commanded direction.

In an exemplary embodiment in which the device acts as a lead-through programming or teaching device, the device 100 includes buttons 150, such as: a motion type selection button; an end-effector operation button; and a teaching button (e.g., teaching, such as, recording a current tool position and an end-effector state). By pressing the motion type button, the operator changes the type of the robot jogging motion for easier operation. The type of the motion can be, for example, translational motion or rotational motion. By pressing the end-effector operation button, the operator commands the robot to operate the end-effector. For example, if the robot has a gripper as an end-effector, the operator can open or close the gripper by pressing the button. Regarding the teaching button, when the end-effector has reached a target location and the end-effector is in a desirable state (e.g., posture or orientation of the end-effector, current state of actuatable members or grippers of the end-effector, etc.), then the operator can command the controller to record the current tool location and the end-effector state by pressing the teaching button. When the teaching button is pressed, then the microphone can be used by the operator to record the description of the taught tool position.

During operation, a robot may collide with an obstacle. To prevent damage to the robot, the end-effector, and the obstacle, the collision needs to be detected so that the robot can be stopped in order to prevent or minimize damage from the collision.

The 3D mouse 160 of the device 100 is configured to detect acceleration of the device 100, and communicate this information with a controller of the robot arm. For example, the 3D mouse is configured to detect acceleration in order to determine vibration of the device or collision with an object. The 3D mouse is configured to transmit the detected acceleration to the controller.

As an acceleration detection device, the 3D mouse 160 can be used for collision detection and vibration control. Since the 3D mouse includes springs and has a mass, it can detect the acceleration applied to the 3D mouse. The formulation to detect the acceleration is as follows:

$$F = m \times a = k \times x \qquad [\text{Eq. 1}],$$

where "m" is the mass of a handle part of the 3D mouse, "a" is the acceleration, "k" is a spring constant of the springs of the 3D mouse, and "x" is the displacement of the handle part.

Figure 8:
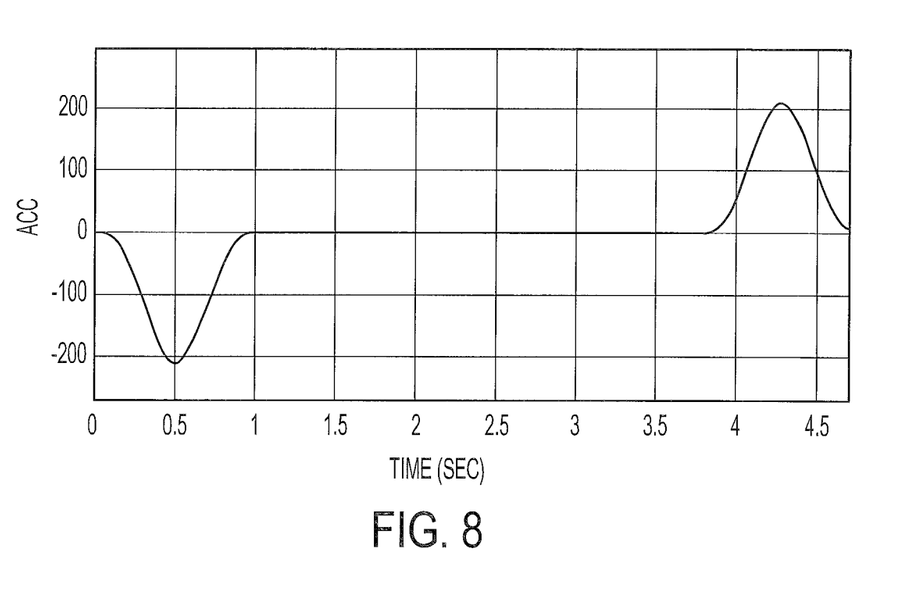
FIG. 8 shows an exemplary plot of acceleration that an embodiment of a device of the present invention experiences during a predetermined normal operation.

The device 100 is used for collision detection by measuring acceleration using the 3D mouse 160. When a robot collides with an object, the 3D mouse will experience acceleration higher than that of normal operation. The acceleration of normal operation can be measured or estimated from a motion model that can be stored in a memory for comparison with current motion. For example, FIG. 8 shows an exemplary plot of acceleration that the device experiences during a predetermined normal operation. In FIG. 8, the device 100 begins in a stopped state at 0 seconds on the timeline, then accelerates from 0 seconds to 1 second along the timeline, then travels at constant speeds from 1 second to 3.75 seconds along the timeline, and then decelerates from 3.75 seconds to 4.75 second along the timeline to a stopped state. (In FIGS. 7 and 8, the acceleration is shown using generic units for acceleration of a unit of length/sec$^2$. Also, in this explanation, the acceleration is shown as a negative value and the deceleration is shown as a positive value; however, the positive/negative designations can be switched.)

Figure 9:
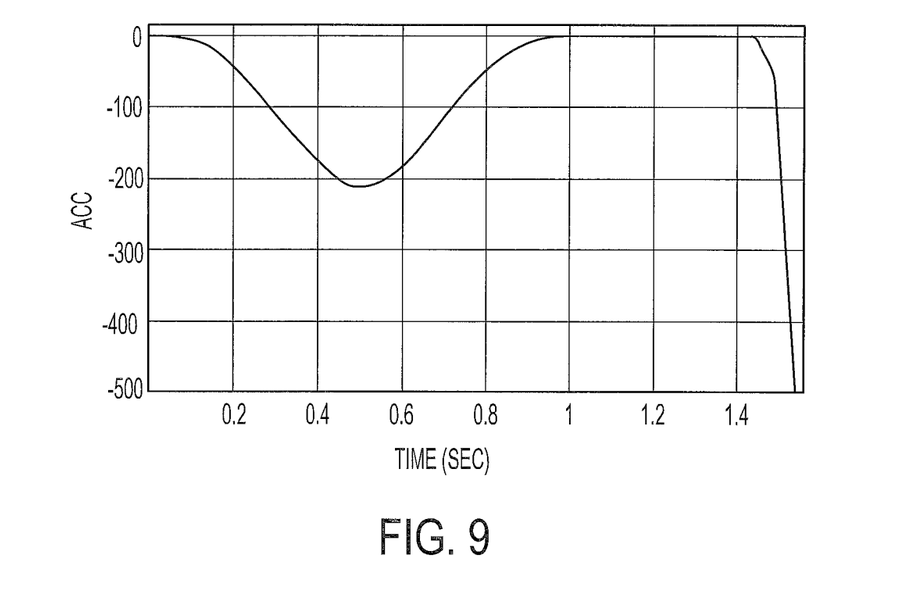
FIG. 9 shows an exemplary plot of acceleration that the embodiment of the device of the present invention experiences when a collision occurs.

FIG. 9 shows an exemplary plot of acceleration that the device 100 could experience when a collision occurs. In FIG. 9, the device 100 begins in a stopped state at 0 seconds on the timeline, then accelerates from 0 seconds to 1 second along the timeline, then travels at constant speeds from 1 second to about 1.45 seconds along the timeline when the device 100 experiences an abnormally high acceleration value (i.e., greatly exceeds the normal about −200 acceleration value), which indicates a collision. When the 3D mouse detects abnormal higher acceleration, collision detection signal is sent to the robot controller, thereby providing feedback control in which the robot is stopped to prevent damage to the robot and the object the robot is colliding with.

Another function of the device 100 is to allow for vibration control. The device 100 can be used to improve motion cycle time, while keeping the vibration of the robot below an allowable value. In situations in which vibration of a robot during motion may not be capable of being fully estimated in advance, conventional robot controllers usually assume the worst case scenario and reduce overall acceleration to avoid potential vibration; however, such assumptions may unnecessarily slow the motion of the robot and reduce efficiency. By measuring the actual vibration of the robot online using the 3D mouse 160 of the device 100, the robot controller can use higher acceleration and, in turn, better cycle time instead of using a lower acceleration value based on the worst case scenario. Additionally, the 3D mouse 160 can be used to measure the acceleration of the robot instead of providing a separate dedicated accelerometer.

Figure 10:
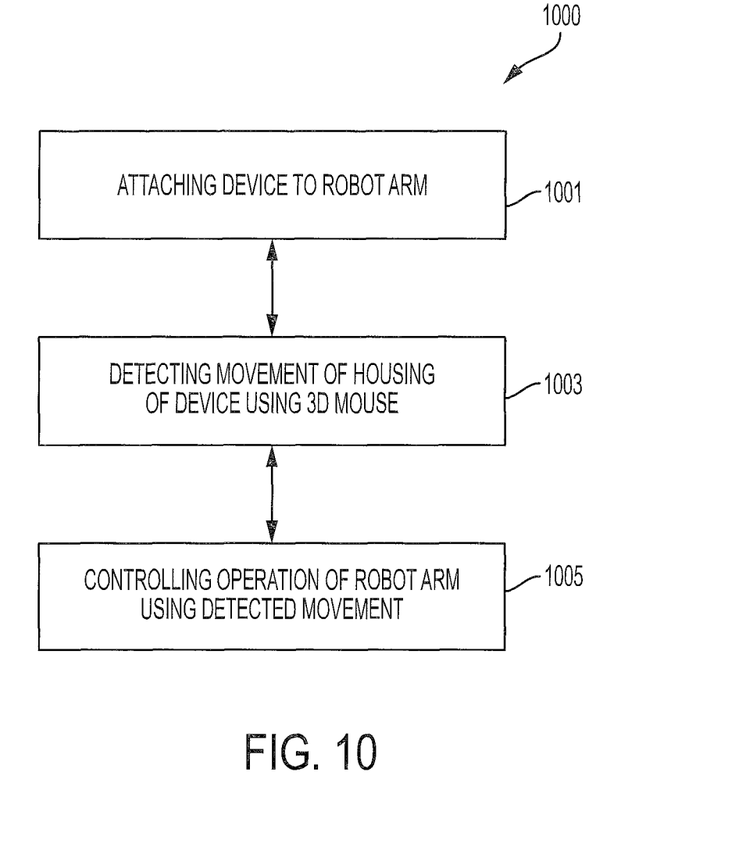
FIG. 10 is a flowchart showing an embodiment of a method of utilizing an embodiment of a device of the present invention with a robot.

FIG. 10 is a flowchart showing a method 1000 of utilizing a device of the present invention with a robot. The method includes a step 1001 of attaching a device (e.g., device 100 of FIG. 1) to a robot arm. The device includes a housing for attaching to the robot arm, a 3D mouse provided within the housing, the 3D mouse being configured to detect movement of the housing, the 3D mouse being configured to communicate with a controller of the robot arm, a user interface configured to operate in conjunction with the 3D mouse, and a connection port provided on the housing, the connection port being configured to connect to an external device. The method further includes a step 1003 of detecting movement of the housing using the 3D mouse, and a step 1005 of controlling operation of the robot arm using the detected movement of the housing.

The method can further include detecting acceleration using the multi-axis motion sensor in order to determine vibration of the device or collision with an object, where the detected acceleration is used to perform feedback control of the operation of the robot arm, for example, as discussed above. The method can further include manipulating the robot arm and operating the user interface to teach an operation of the robot arm to the controller, for example, as discussed above. The method can include operating the user interface to select a type of motion of the robot attn. The method can also include operating the user interface to control operation of an end effector mounted to the robot arm, and/or operating the user interface to control the external device via the connection port.

It should be noted that the exemplary embodiments depicted and described herein set forth the preferred embodiments of the present invention, and are not meant to limit the scope of the claims hereto in any way. Numerous modifications and variations of the present invention are possible in light of the above teachings. It is therefore to be understood that, within the scope of the appended claims, the invention may be practiced otherwise than as specifically described herein.

What is claimed is:

1. A device comprising:
    a housing configured to attach to a robot arm;
    a multi-axis motion sensor provided within the housing, the multi-axis motion sensor being configured to detect movement of the housing, the multi-axis motion sensor being configured to communicate with a controller of the robot arm;
    a user interface configured to operate in conjunction with the multi-axis motion sensor; and
    a connection port provided on the housing, the connection port being configured to connect to an external device.

2. The device according to claim 1, further comprising a mounting plate attached to the housing,
    wherein the mounting plate is configured to attach to a mechanical interface on the robot arm with an end effector attached to the mechanical interface in a parallel configuration such that a load applied to the end effector does not act on the housing.

3. The device according to claim 1, further comprising:
    a mounting plate attached to a first portion of the housing, the mounting plate being configured to attach to a mechanical interface on the robot arm; and
    an end effector plate attached to a second portion of the housing opposite to the first portion,
    wherein the mounting plate is configured to attach to the mechanical interface and the end effector plate is configured to attach to the end effector in a series configuration such that a load applied to the end effector acts on the housing.

4. The device according to claim 1, wherein the housing includes:
    a base housing having a recess receiving the multi-axis motion sensor; and
    a cap connected to the base housing and covering the recess,
    wherein the user interface includes one or more first user interface devices provided on an outer circumferential surface of the base housing, and
    wherein the user interface includes on one or more second user interface devices provided on an outer circumferential surface of the cap.

5. The device according to claim 4,
    wherein the connection port is provided on the outer circumferential surface of the base housing,
    wherein the user interface includes a microphone, and
    wherein the microphone is provided on the outer circumferential surface of the base housing.

6. The device according to claim 1,
    wherein the multi-axis motion sensor is configured to detect acceleration in order to determine vibration of the device or collision with an object, and
    wherein the multi-axis motion sensor is configured to transmit the detected acceleration to the controller.

7. The device according to claim 1, wherein the user interface includes one or more buttons configured to communicate with the controller of the robot arm.

8. The device according to claim 1, wherein the user interface includes one or more of:
    a motion selection button configured to select a type of motion of the robot arm;
    an end effector button configured to control operation of an end effector mounted to the robot arm; and
    a teaching button control to teach an operation of the robot arm to the controller.

9. The device according to claim 1,
    wherein the user interface is configured to control the external device via the connection port, and
    wherein the connection port is configured to provide power to the external device.

10. The device according to claim 1, wherein the connection port includes:
    a power port configured to provide power to the external device;

a communication port configured to allow communication between the external device and at least one of the user interface and the controller; and a mechanical interface configured to mount the external device to the housing.

11. The device according to claim 1,
wherein the user interface includes one or more lights configured to provide indicia of a status of operation of the robot arm,
wherein the user interface includes a microphone, and
wherein the external device is a camera, a light, or an accelerometer.

12. The device according to claim 1, wherein the device does not include a force sensor or load sensor.

13. A robot comprising:
a robot arm;
a controller configured to control the robot arm; and
a device comprising:
   a housing attached to the robot arm;
   a multi-axis motion sensor provided within the housing, the multi-axis motion sensor being configured to detect movement of the housing, the multi-axis motion sensor being configured to communicate with the controller of the robot arm;
   a user interface configured to operate in conjunction with the multi-axis motion sensor; and
   a connection port provided on the housing, the connection port being configured to connect to an external device.

14. A method comprising:
attaching a device to a robot arm, the device including:
   a housing for attaching to the robot arm;
   a multi-axis motion sensor provided within the housing, the multi-axis motion sensor being configured to detect movement of the housing, the multi-axis motion sensor being configured to communicate with a controller of the robot arm;
   a user interface configured to operate in conjunction with the multi-axis motion sensor; and
   a connection port provided on the housing, the connection port being configured to connect to an external device; and
detecting movement of the housing using the multi-axis motion sensor; and
controlling operation of the robot arm using the detected movement of the housing.

15. The method according to claim 14, further comprising detecting acceleration using the multi-axis motion sensor in order to determine vibration of the device or collision with an object, wherein the detected acceleration is used to perform feedback control of the operation of the robot arm.

16. The method according to claim 14, further comprising manipulating the robot arm and operating the user interface to teach an operation of the robot arm to the controller.

17. The method according to claim 14, further comprising operating the user interface to select a type of motion of the robot arm.

18. The method according to claim 14, further comprising operating the user interface to control operation of an end effector mounted to the robot arm.

19. The method according to claim 14, further comprising operating the user interface to control the external device via the connection port.

20. The method according to claim 14, wherein the user interface includes one or more lights, and further comprising providing indicia of a status of operation of the robot arm using one or more lights.

* * * * *